UNITED STATES PATENT OFFICE.

ARTHUR WEINBERG, OF FRANKFORT-ON-THE-MAIN, GERMANY, ASSIGNOR TO LEOPOLD CASSELLA & CO., OF FRANKFORT-ON-THE-MAIN, GERMANY.

BLUE WOOL-DYE AND PROCESS OF MAKING SAME.

SPECIFICATION forming part of Letters Patent No. 703,105, dated June 24, 1902.

Application filed January 14, 1902. Serial No. 89,792. (Specimens.)

*To all whom it may concern:*

Be it known that I, ARTHUR WEINBERG, a citizen of Prussia, and a resident of Frankfort-on-the-Main, in the Province of Hesse-Nassau and Kingdom of Prussia, Germany, have invented certain new and useful Improvements in the Production of Blue Wool-Dyes, of which the following is a specification.

I have found that by alkylating the amido group of that azo body, which is obtained by reducing the nitro group of the p. nitro-chlorbenzene-azo peridioxynaphthalene sulfo-acid, a new pure-blue wool dyestuff is obtained, which is particularly distinguished by its leveling power, fastness to alkalies and to light.

The method of production is illustrated by the following example: 17.3 kilos o. chlor p. nitranilin are dissolved in fifty-two kilos sulfuric acid of 66° Baumé. This solution is then diluted with ice, and seven kilos solid nitrite are added. The solution of the diazo compound is introduced into a solution of 1.8. dioxynaphthalene 3.6.disulfo-acid in the presence of an excess of acetate of soda. The formation of the dyestuff being completed, the solution is made slightly alkaline, best with caustic soda-lye, and at 40° centigrade a solution of forty-eight kilos cryst. sodium sulfid added. The blue color of the solution changes soon to red. After about twelve hours the solution is carefully neutralized with muriatic acid and precipitated with common salt. The raw coloring-matter is dissolved in alcohol of fifty per cent., and twenty-two kilos ethyl bromid and thirty kilos sodium acetate are added and the whole gradually heated in a closed vessel to 90° centigrade. After the solution being kept at this temperature for about six hours the alcohol is distilled off and the dyestuff precipitated with common salt from the solution previously neutralized with soda. In the place of ethyl bromid and acetate other means of alkylating, such as methyl sulfuric acid or benzylchlorid, may be used. The thus-produced coloring-matter shows the following reactions: It is easily soluble in water with a bright-blue color, which turns into claret-red by addition of alkalies. Strong mineral acids precipitate the color from its aqueous solution in form of scarlet flakes. It dissolves in concentrated sulfuric acid with a reddish-violet color. It dyes wool fast-blue shades.

Having thus described the nature of my invention and in what manner it is to be carried out, what I claim is—

1. The process of producing fast-blue coloring-matters by combining p. diazonitro-o.-chlorbenzene with 1.8. dioxynaphthalene 3.6. disulfonic-acid, reducing the nitro group and treating the resulting product with alkylating agents substantially as described.

2. The blue coloring-matter above described which is a blackish-blue powder, easily soluble in water with a bright-blue color turning to claret-red by addition of alkalies, being precipitated from its aqueous solution by mineral acids in shape of red flakes, dissolving in strong sulfuric acid with reddish-violet color and dyeing wool fast-blue shades substantially as described.

Signed at Frankfort-on-the-Main, in the Province of Hesse-Nassau and Kingdom of Prussia, this 28th day of December, A. D. 1901.

ARTHUR WEINBERG.

Witnesses:
JEAN GRUND,
CARL GRUND.